Oct. 12, 1943.   H. R. LIEBERT   2,331,404
AIRSHIP
Filed May 31, 1940   3 Sheets-Sheet 1
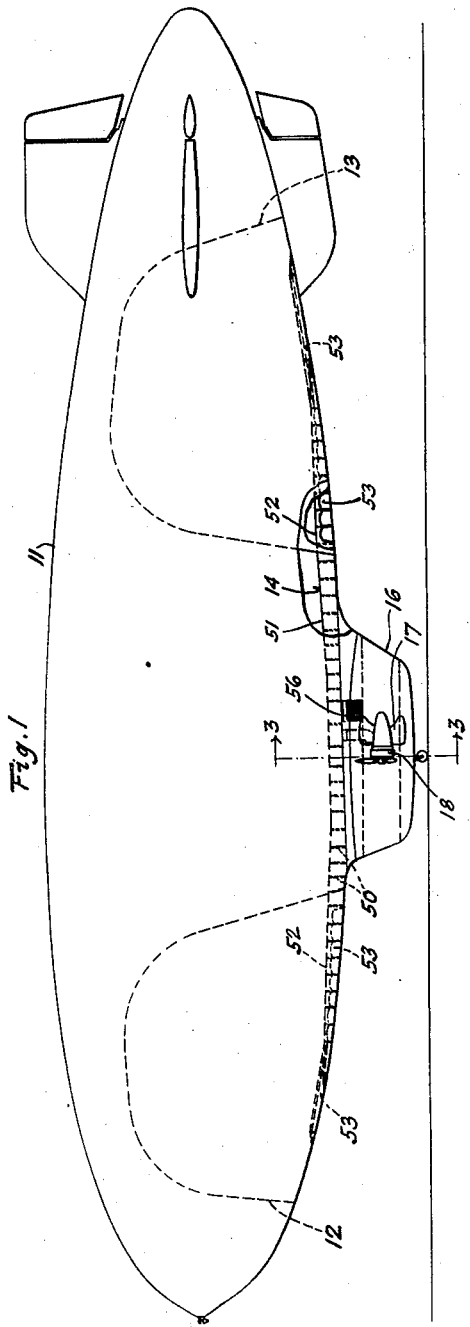
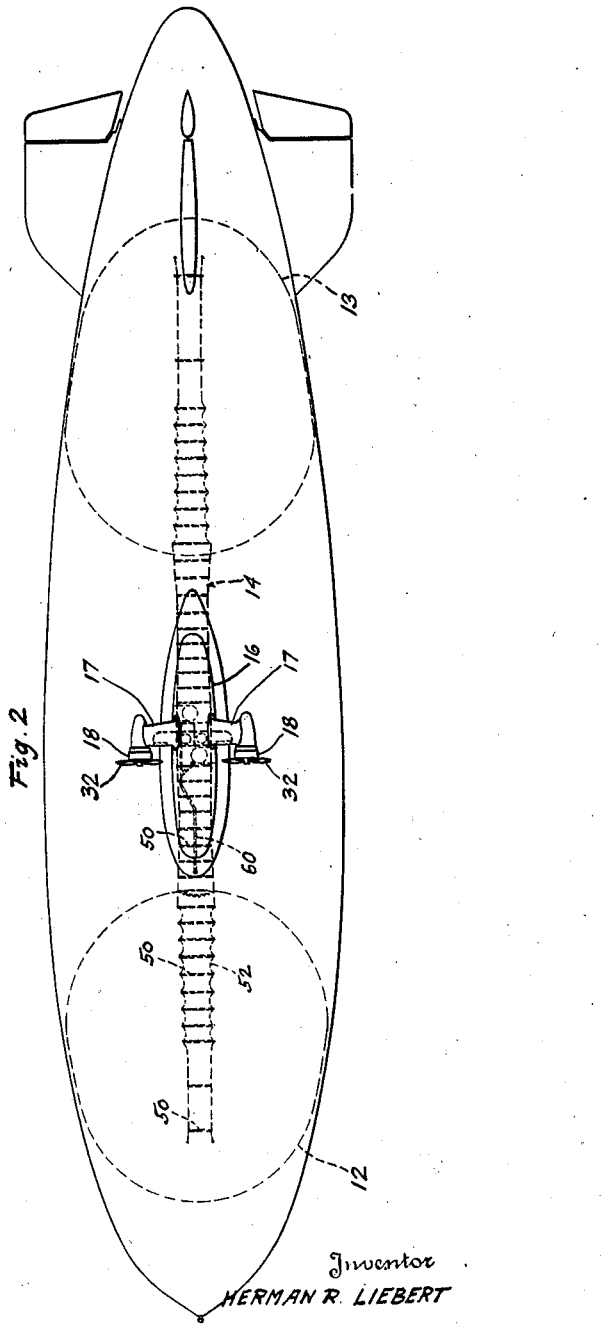
Inventor
HERMAN R. LIEBERT

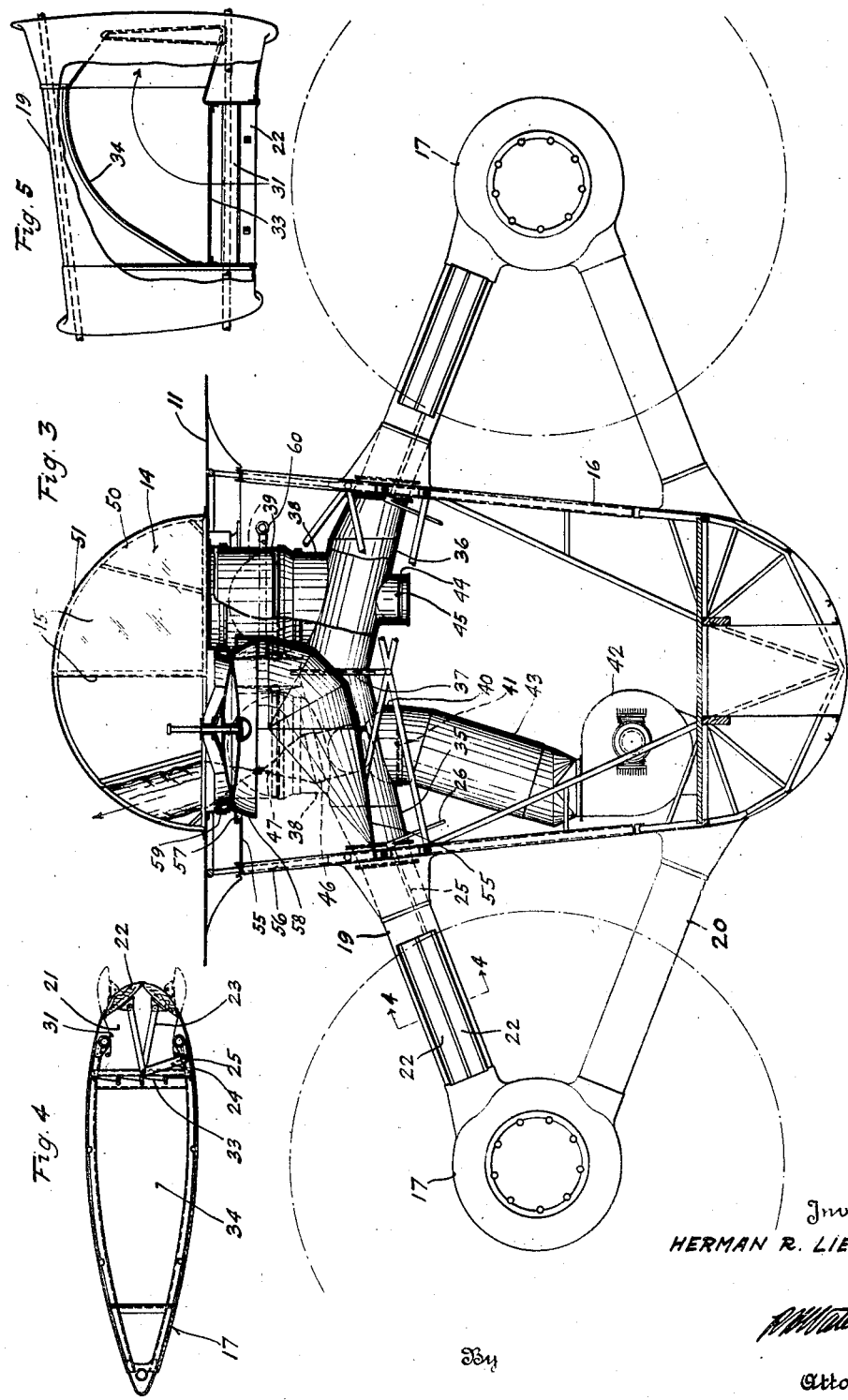

Patented Oct. 12, 1943

2,331,404

UNITED STATES PATENT OFFICE 2,331,404

AIRSHIP

Herman R. Liebert, Akron, Ohio, assignor, by mesne assignments, to Wingfoot Corporation, Akron, Ohio, a corporation of Delaware Application May 31, 1940, Serial No. 338,062

17 Claims. (Cl. 244—30)

This invention relates to the construction of airships and especially non-rigid airships, which are operated at internal pressure by means of air bags, and has particular reference to the improvement of the air system for controlling the internal pressure of such airships.

One object of this invention is to reduce the air resistance due to projecting air scoops in previous constructions.

Another object of this invention is to control the pressure on the discharge side of the air safety valves which discharge air from the ballonets, also applicable for gas safety valves.

A further object of this invention is to avoid having air trapped in the air ballonets when the airship rises above pressure height.

Other objects of the invention will appear hereinafter as the description thereof proceeds, the novel features, combinations and arrangement of parts being clearly set forth in the specification and in the claims thereunto appended.

For a better understanding of this invention reference shall now be had to the accompanying drawings of which:

Fig. 1 is a side view of a non-rigid airship incorporating this invention;

Fig. 2 is a bottom plan view of Fig. 1;

Fig. 3 is a cross-sectional view of the control car taken along the line 3—3 of Fig. 1 with parts thereof shown in section;

Fig. 4 is an enlarged cross-sectional view of an upper strut of an engine outrigger taken along the line 4—4 in Fig. 3;

Fig. 5 is a top view of the upper left outrigger arm looking in a direction parallel thereto, parts being sectional for the sake of clearness;

Figure 6:
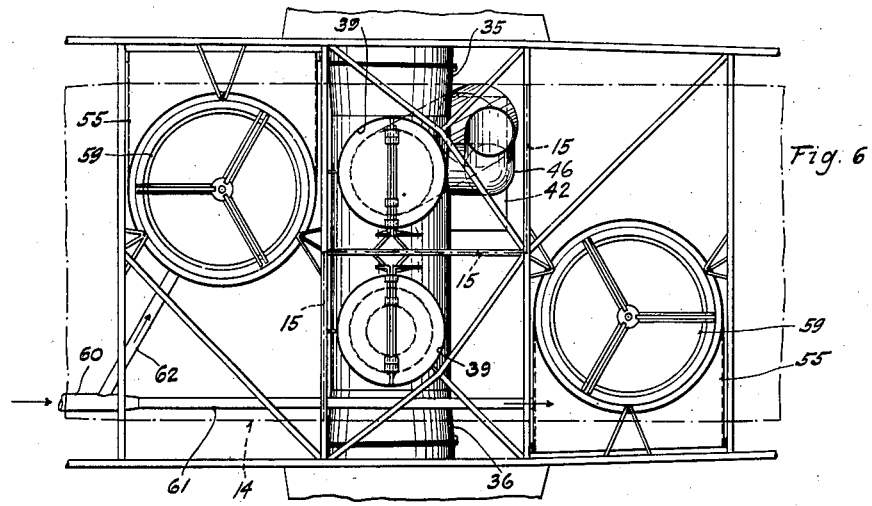
Fig. 6 is a fragmentary top plan view of the control car.

In the drawings the numeral 11 indicates the lifting gas envelope, 12 and 13 are air ballonets controlling the internal pressure of the gas envelope and 14 indicates generally a non-collapsible air duct within the gas envelope connected to both air ballonets. A vertical partition 15 somewhat Z-shaped in horizontal cross-section (see Figs. 3 and 6) divides the air duct 14 into a front portion communicating with the ballonet 12 and a rear portion communicating with the ballonet 13. The control car 16 attached to the bottom of the gas envelope carries two outriggers 17, one at each side, supporting the power units 18 (Figs. 1 and 2). Each outrigger includes two streamlined struts 19 and 20, of which the strut 19 is provided with an air inlet or scoop 21, to be regulated by foldable shutters 22 (see Fig. 4) of vane-like cross-section conforming in closed condition to the streamlined shape of the strut 19.

The shutters are controlled by push rods 23, which are pivoted to a lever 24 attached to a shaft 25, which in turn extends into the control car and is provided with a hand-operating lever 26. By operating this lever the shutters 22 can be moved between fully closed and fully open position, indicated by solid and dotted lines respectively in Fig. 3. Each scoop opening can be regulated independently of the other and the streamlined shutters can be fixed in any desired position to suit the conditions and to keep the drag as low as possible. Fairings 31 insure a smooth entrance into the scoop of the air furnished by the slip stream of the propeller 32 and passing through the register 33 which opens by the inrushing air.

Figure 7:
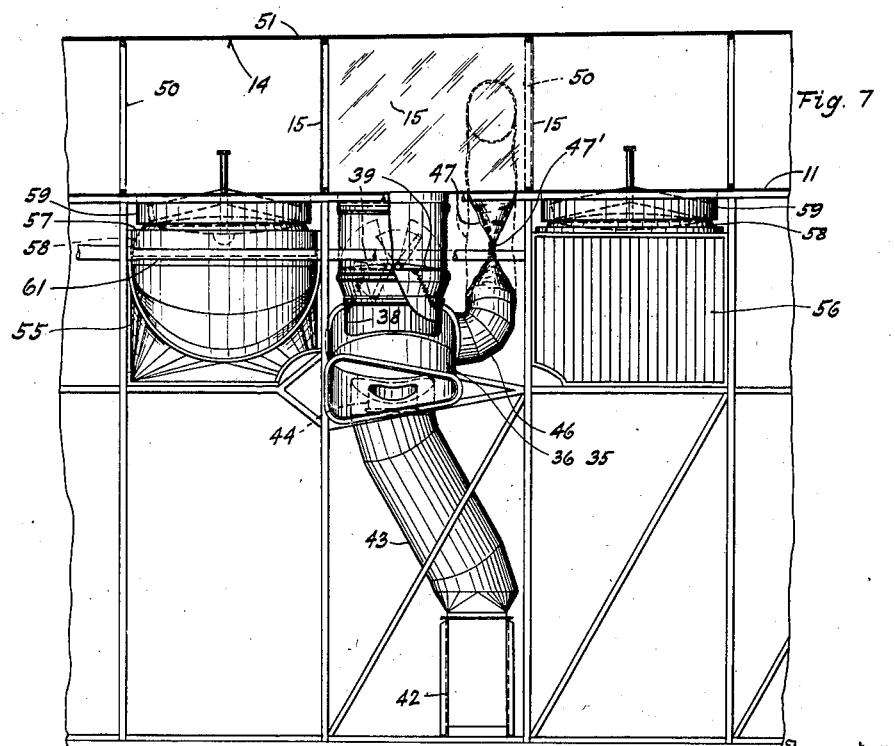
Fig. 7 is a side view of Fig. 6 with the covering omitted.

The air then passes through the duct 34 (see Figs. 4 and 5) in the interior of the outrigger strut 19. With this arrangement no separate air scoops and outside air ducts are required and therefore considerable air resistance as compared with conventional designs has been eliminated. The air ducts 34 in the outriggers are connected respectively to duct portions 35 and 36 which are identical and which are joined by flanges 37 in the center of the control car and are in intercommunication with each other. Each of the duct portions 35 and 36 has a vertical outlet 38 which terminates in the separated front and rear portions, respectively, of the longitudinal air duct 14. The air outlets 38 are provided with conventional hand-operated butterfly valves 39, shown also by dotted lines in open position (Fig. 7).

The duct portion 35 has an air inlet 40 at the bottom which normally is closed by a butterfly valve 41 indicated in dotted lines. This valve is held in closed position by springs or the like (not shown) and is pushed open by the pressure of the air when the fan 42, which is connected to the air inlet 40 by a duct portion 43, is being operated to furnish air to the ballonets when the power plants 18 are shut down, or only operating at low speed, insufficient to provide the required pressure in the ballonets.

The duct portion 36 has at the bottom an air duct inlet 44, provided with a butterfly valve 45 operating similarly to the valve 41. This air inlet is to be used for the attachment of an outside air supply when the airship is in the hangar or lying at the mast.

At one side of the duct portion 35 there is arranged an air outlet 46 (see Fig. 7) which communicates by a gas-tight fabric sleeve 47 with the gas compartment 11. However, this sleeve normally is tied together, as at 47', to keep the air and gas separated. This connection is made use of only in case of emergency, that is, when the airship has lost too much gas by flying above pressure height and the fully inflated pressure ballonets are no longer capable of establishing the proper pressure in the gas envelope. In this case the fabric sleeve is untied and enough air is let into the gas space to give it required operating pressure. After that condition is established the sleeve is tied up again.

The air duct 14 is of non-collapsible construction and each end reaches into an air ballonet almost its full length. Inverted U-shaped frames 50 are properly spaced inside the air duct to make it non-collapsible and are covered with gas-tight fabric 51 within the gas space. The cover portions 52 of the duct extending inside the air ballonets can be made of plain fabric, which however does not reach down at the sides to the gas envelope to provide openings 53 at both sides for their entire length, whereby there is no possibility for air being trapped when the ballonets rest against the bottom of the envelope to thus cause the expulsion of gas instead of air still contained in the ballonets. To prevent this in previous constructions, it was necessary to arrange a number of air safety valves longitudinally in each ballonet; that of course was more complicated and more expensive.

Also disposed in the control car, below the longitudinal air duct are two elbow-shaped casings 55 forming outlets for air from the ballonets, the one located at port and the other at starboard. One end of the casing is fitted into the side wall of the control car and opens to the outside through louvers 56, and there is another opening 57 at its top, into which extends a cowling 58 attached to the bottom of the air safety valve 59 of usual construction that is in air-tight connection with the air duct 14. The arrangement of the air safety valves within the control car 14 or within the keel as in the case of a semi-rigid airship, and away from the outside airflow has the advantage that the valves are less affected by the suction created by the airflow. However, since there is still a tendency of a reaction on the valve setting due to that effect, a pressure pipe 60 is provided, which leads from the front of the control car or from some point in the pressure system, either inside or outside of the control car, and connects with branches 61 and 62, respectively, to the outlet casings 55 to feed air into them, thereby compensating for eventual pressure decrease by suction.

This arrangement which, of course, may be equally well applied for gas safety valves, not illustrated, has the advantage that no outside devices which create air resistance need to be applied to overcome the suction effect upon the safety valves. On the other hand, all parts of the air ducts, including the ballonets are accessible during flight.

Obviously those skilled in the art to which this invention pertains may make various changes in the particular construction combinations and arrangement of parts without departing from the spirit of my invention and, therefore, I do not wish to be limited except as hereinafter set forth in the claims hereunto appended.

Having thus fully described my invention, what I claim and desire to secure by Letters Patent of the United States is:

1. In an airship of the pressure type, comprising an envelope for lifting gas, an air ballonet in the envelope, an outrigger carried in association with said envelope and supporting a power unit, said outrigger having an air inlet in the front portion of said outrigger which serves as scoop for supplying air under pressure to said ballonet to maintain the envelope of the airship under pressure during flight with the same outer streamlined contour.

2. In an airship of the pressure type, comprising a lifting gas envelope containing at least one air ballonet, a control car attached to the envelope, outriggers on said control car for supporting the power units, air inlets provided in said outriggers, and ducts built into said outriggers within the outer contour thereof and extending into the control car for the passage of air into said ballonets.

3. An airship of the pressure type, comprising a control car attached to the bottom of said airship, outriggers on said control car for supporting the power units, each outrigger including one or more stream-lined struts, and at least one of which has an opening in the leading edge thereof, a conduit extending through said strut in communication with said opening, and shutters, their outer surface conforming to the contour of the stream-lined strut, for controlling the amount of air needed for maintaining the pressure in the airship.

4. In an airship of the pressure type, a lifting gas envelope and at least one air ballonet therein, a control car attached to the bottom of said envelope and safety valves mounted on said envelope within said control car and in communication with said ballonet.

5. In an airship of the pressure type a lifting gas envelope and at least one air ballonet therein, a non-collapsible gas-tight conduit attached to the inside of the bottom of said envelope for supplying air to said ballonet, and safety valves mounted on said envelope within said non-collapsible conduit for exhausting air therefrom.

6. In an airship of the pressure type, a lifting gas envelope and at least one air ballonet therein, a control car attached to the bottom of said envelope, safety valves mounted on said envelope within said control car, and in communication with said ballonet, and casings leading the air and gas respectively expelled through said safety valves by means of louvers, located in the outer ends of said casings, outside of the control car.

7. In an airship of the pressure type, a lifting gas envelope enclosing at least one air ballonet, a control car attached to the bottom of said envelope, safety valves for said envelope and ballonet mounted on said envelope within said control car, casings for conducting air and gas respectively expelled through said safety valves, louvers located in the outer ends of said casings outside of the control car through which said expelled air and gas are adapted to pass, and a pressure air conduit running from a point of higher pressure than that of the control car into said casings to compensate for the suction eventually created by the air in the louvers of said casings.

8. In an airship of the pressure type including a ballonet, a ballonet air supply and exhausting system including an air safety valve, a casing below said safety valve, louvers in said casing for conducting the air expelled through said valve into the outside atmosphere, and a pressure air conduit leading from a point of higher pressure than that of the control car into said casing of lower pressure to compensate for the suction eventually created by the air in the louvers of said casing.

9. In an airship of the pressure type, a lifting gas envelope enclosing at least one air ballonet, a non-collapsible air duct inside and at the bottom of said envelope reaching into the air ballonet substantially over its full length, said duct having permanently open side openings within the air ballonet to permit all air to escape through the duct even when the air ballonet is pressed against the bottom of said envelope.

10. In an airship of the pressure type, a lifting gas envelope enclosing at least one air ballonet, a non-collapsible air duct inside and at the bottom of said gas envelope reaching into the air ballonet, said air duct consisting of rigid transverse frames completely covered by gas-tight fabric within the gas space and gas-tightly connected with the gas envelope and the air ballonet and by ordinary fabric within the air ballonet, the covering of said air duct within the air ballonet being open at the bottom along the sides to let the entire air in the ballonet escape through said duct.

11. In an airship of the pressure type, a gas envelope containing at least one air ballonet, a power unit including a propeller, a hollow support for said power unit longitudinally streamlined on its outer surface and serving as an air duct for delivering air into said air ballonet, the leading edge of said support lying in the slip stream of said propeller and being provided with an opening, and shutters to open and close said opening and shaped to form in closed condition a portion of the leading edge of said streamlined support.

12. In an airship of the pressure type, a gas envelope containing at least one air ballonet, a power unit including a propeller, a hollow support for said power unit longitudinally streamlined on its outer surface and serving as an air duct for delivering air into said air ballonet, the leading edge of said support lying in the slip stream of said propeller and being provided with an opening, shutters to open and close said opening shaped to form in closed condition a portion of the leading edge of said stream-lined support, and means for moving said shutters to regulate said opening.

13. In an airship of the pressure type a lifting gas envelope enclosing at least one air ballonet, a longitudinally extending, non-collapsible air duct at the bottom and on the inside of said envelope leading into said air ballonet over most of its length, side openings in said air duct within the air ballonet, a control car attached to the bottom of the gas envelope, outriggers extending from the sides of the control car for supporting the power units, air scoops and air ducts built into the outriggers, air duct extensions located in the control car and leading into said non-collapsible air duct, safety valves located at the bottom of the gas envelope and underneath said non-collapsible air duct within said control car, casings communicating by means of louvers through the side walls of the control car and towards said valves and serving as escapes for the air expelled through said safety valves, and a pressure air pipe running from a point of higher pressure than that of the control car into said casing of lower pressure to compensate for the suction created by the air by-passing the louvers of said casing.

14. In an airship of the pressure type comprising a gas envelope, at least one ballonet therein, means for supplying air to said ballonets, valves for exhausting gas from said gas space, and means for supplying air to the gas space within the gas envelope so that the air mixes with the gas and the necessary pressure is built up to keep said envelope taut in an emergency.

15. An airship of the pressure type comprising a gas envelope, at least one ballonet therein, means for supplying air to said ballonets, valves for exhausting gas from said gas space, and means for supplying air to the gas space within the gas envelope so that the air mixes with the gas and the necessary pressure is built up to keep said envelope taut in an emergency, said last-mentioned means comprising an air pump mounted on said airship.

16. In an airship of the pressure type, a lifting gas envelope and at least one air ballonet therein, a control car directly attached to the bottom outside of said envelope, a non-collapsible conduit attached to the bottom inside of said envelope and extending longitudinally into said ballonet to which it is to supply the air, safety valves mounted on said envelope within the width of said conduit and within said control car, and an air duct attached at one end to one of said valves and at its other end leading through a side wall of said control car into the atmosphere.

17. In an airship of the pressure type, a lifting gas envelope and at least one air ballonet therein, a control car directly attached to the bottom outside of said envelope, a conduit connecting the ballonet with the inside of the control car, a valve positioned in the end of the conduit within the control car, and a conduit running from the valve through a side wall of the control car and discharging into the atmosphere.

HERMAN R. LIEBERT.